United States Patent [19]
Powell, Jr.

[11] 3,913,691
[45] Oct. 21, 1975

[54] FRUIT DELIVERY, WEIGHING, AND BAGGING APPARATUS

[75] Inventor: Harry C. Powell, Jr., Faber, Va.

[73] Assignee: Powell Machinery, Inc., Faber, Va.

[22] Filed: July 1, 1974

[21] Appl. No.: 484,926

[52] U.S. Cl. ............................ 177/202; 177/255
[51] Int. Cl.² ..................... G01G 1/18; G01G 21/24
[58] Field of Search .......... 177/202, 255, 256, 261, 177/262

[56] References Cited
UNITED STATES PATENTS

| | | | |
|---|---|---|---|
| 1,520,372 | 12/1924 | Syers | 177/255 X |
| 2,408,906 | 10/1946 | Bocchicchio | 177/262 X |
| 2,812,935 | 11/1957 | Mettler et al. | 177/255 |
| 3,366,190 | 1/1968 | Lau | 177/255 X |

Primary Examiner—George H. Miller, Jr.
Attorney, Agent, or Firm—Cushman, Darby & Cushman

[57] ABSTRACT

An assembly for semi-automatic weighing and bagging of fruit or like product. A feed apparatus, including a motor driven soft-bristle spiral brush, delivers fruit past a gate to a pivotal scoop for facilitating weighing and bagging of the fruit. The amount of fruit accumulated in the scoop is weighed by a scale - the scale having a four point linkage system with ball bearings at each pivot point - and the amount of weight is sensed by a photocell responsive to movement of a moveable member of the scale. Circuitry connected to the photocell displays the weight of the accumulated fruit on a visual display, and provides for dynamic braking of the feed motor and movement of the gate to a position wherein it prevents delivery of fruit to the scoop. After the scoop is emptied and moved back to normal position, the motor is activated and the gate removed and the operation can be repeated.

8 Claims, 7 Drawing Figures

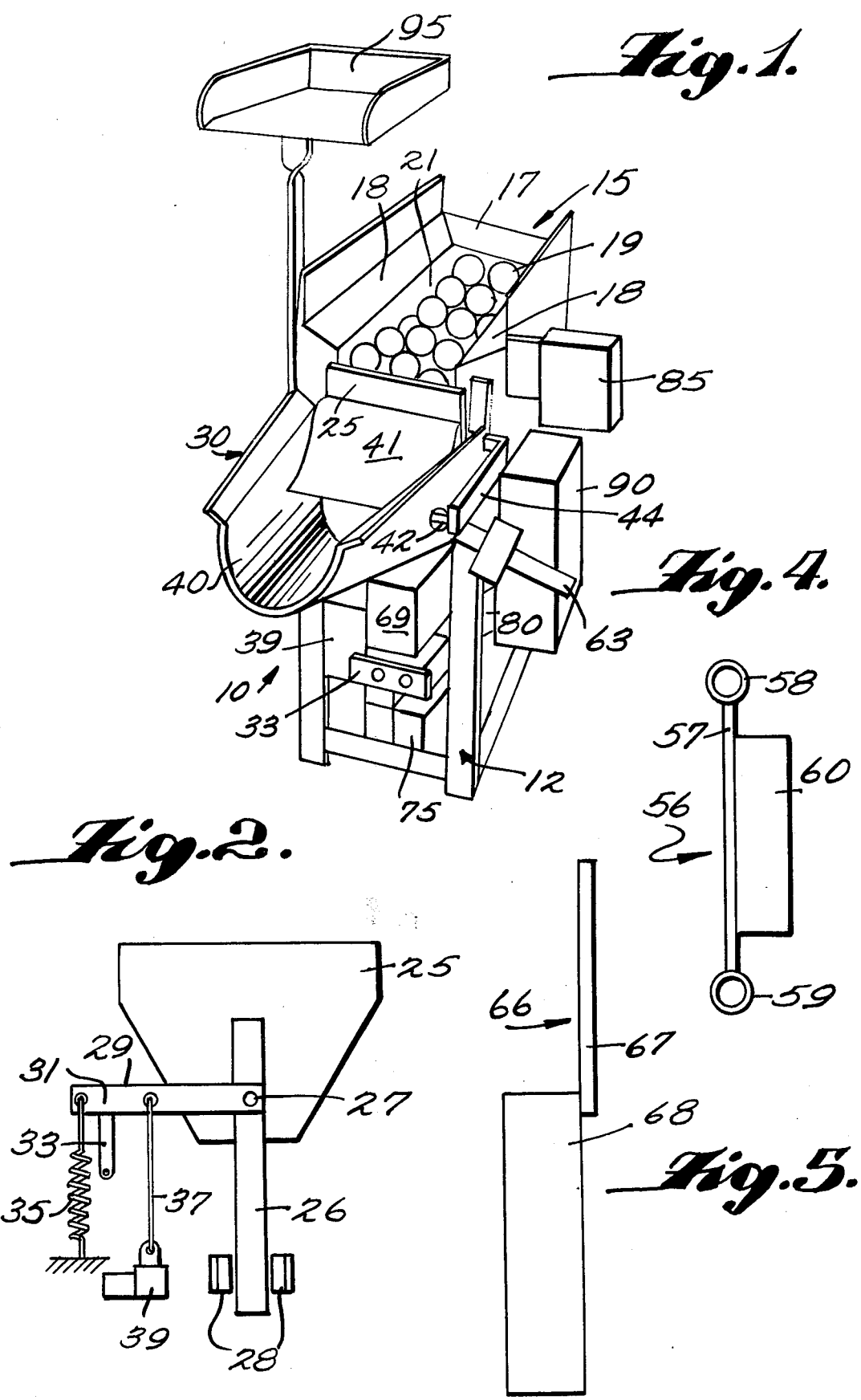

FRUIT DELIVERY, WEIGHING, AND BAGGING APPARATUS

BACKGROUND AND SUMMARY OF THE INVENTION

The invention relates to semi-automatic means for batch weighing and bagging of fruit or like product and to the feed, weighing and sensing means therefor. Although there are many prior art devices for the batch weighing and bagging of fruit [see example U.S. Pat. Nos. 536,334, 1,644,260, 2,889,130, 3,155,183, and 3,695,371] none of the prior art devices have provided a batch weighing and bagging assembly that employs feed apparatus for feeding fruit to a combination scale and bagging scoop device in single file with minimum bruising, a scale having minimum friction and maximum sensitivity (to ⅓ ounce) with maximum repeat accuracy, a damping means for damping out oscillations in the scale in movement in either the clockwise or counterclockwise directions for maintaining the repeat accuracy of the scale, and means responsive to the weight of fruit accumulated in the scoop for positively stopping the delivery of fruit to the scoop without any mechanical interaction with or hindrance of the scale. The assembly according to the teachings of the present invention employs all the above structures and therefore effectively and efficiently facilitates bagging of fruit with as small an increment of weight as possible over the desired bag weight of the fruit.

According to the teachings of the present invention, a motor operated spiral soft-bristle brush operates in conjunction with a cylindrical soft-bristle brush to feed fruit to a scoop weighing and bagging apparatus with minimum bruising of fruit. The fruit is delivered in single file by the feed apparatus so that only one piece at a time will be delivered to the scoop weighing and bagging assembly so that only the minimum number of pieces of fruit comprising a given bag weight may be packaged together. When a given weight of fruit is accumulated in the scoop, the motor for the feed apparatus is positively braked, and to further insure that more fruit will not be delivered for the bag composed of said given weight of fruit, a solenoid-operated gate is moved between the feed appararatus and the scoop.

Then the scoop may be manually pivoted over-center so that it is facing downwardly, and the fruit therein thereby allowed to fall into a bag attached to the end of the scoop. After the bag is filled and tied off, the scoop is pivoted back to its normal position and actuates a reset switch for again energizing the solenoid and starting the feed motor.

The weight of accumulated fruit within the scoop is measured by a scale. The scale includes a moveable member operatively pivotally mounting the scoop, a stationary member rigidly attached to the frame for the whole assembly, and two box-shaped links pivotally connected to both the moveable and the stationary members at spaced locations thereof. Pins received by the box-shaped links extend through collars of the moveable and stationary members, and ball-bearings are provided between the pins and the collars. This construction provides a scale mechanism that is rugged and virtually friction free and thus extremely accurate during each operation of repeated operations. An adjustable weight is rigidly connected to one of the link members for balancing off the scoop.

The means employed for sensing the accumulated fruit within the scoop does not in any way add any friction to the system, and thus does not interfere with the accuracy of the scale in any way. The sensing means includes an adjustable vane attached to the bottom of the moveable scale member, a photocell, and a light source. The vane extends between the light source and the scale in one position thereof, and then is gradually moved out from between the light source and the photocell. As the amount of light hitting the photocell changes dependent upon the position of the moveable scale member, the position of the scale member will be translated to a visual display of the corresponding weight of accumulated fruit in the scoop by readout circuitry and a meter. In addition to providing displaying of what the weight of accumulated product is on the meter, the photocell will also operate to cut off power to and dynamically brake the feed apparatus motor and de-energize the solenoid for the gate when a predetermined amount of fruit accumulates in the scoop so that delivery of more fruit than the predetermined amount to the scoop will be prevented.

It is an object of the present invention to provide an assembly for batch weighing and bagging fruit that is rugged, accurate, and efficient.

It is a further object of this invention to provide feed apparatus for a fruit batch weighing and bagging assembly that delivers fruit in single file with a minimum amount of bruising.

It is a further object of this invention to provide a scale for a fruit batch weighing and bagging assembly that is extremely rugged and accurate despite repeated operations in quick succession.

It is a still further object of this invention to provide a means responsive to the weight of accumulated product that positively stops delivery of fruit after a predetermined weight of fruit has accumulated, and provides an easily readable visual display of what the weight of the accumulated product is, while not interfering with the operation of the scale.

These and other objects of the invention will become clear from an inspection of the detailed description of the invention and from the appended claims.

BRIEF DESCRIPTION OF THE DRAWINGS

FIG. 1 is a perspective view of an exemplary weighing and bagging assembly according to the teachings of the present invention;

FIG. 2 is a frontal detail view with other parts removed of a gate and operating means therefor according to the teachings of the present invention;

FIGS. 4 and 5 are detail views of the stationary scale member and damping paddle shown in FIG. 3, respectively;

DETAILED DESCRIPTION OF THE INVENTION

Figure 3:
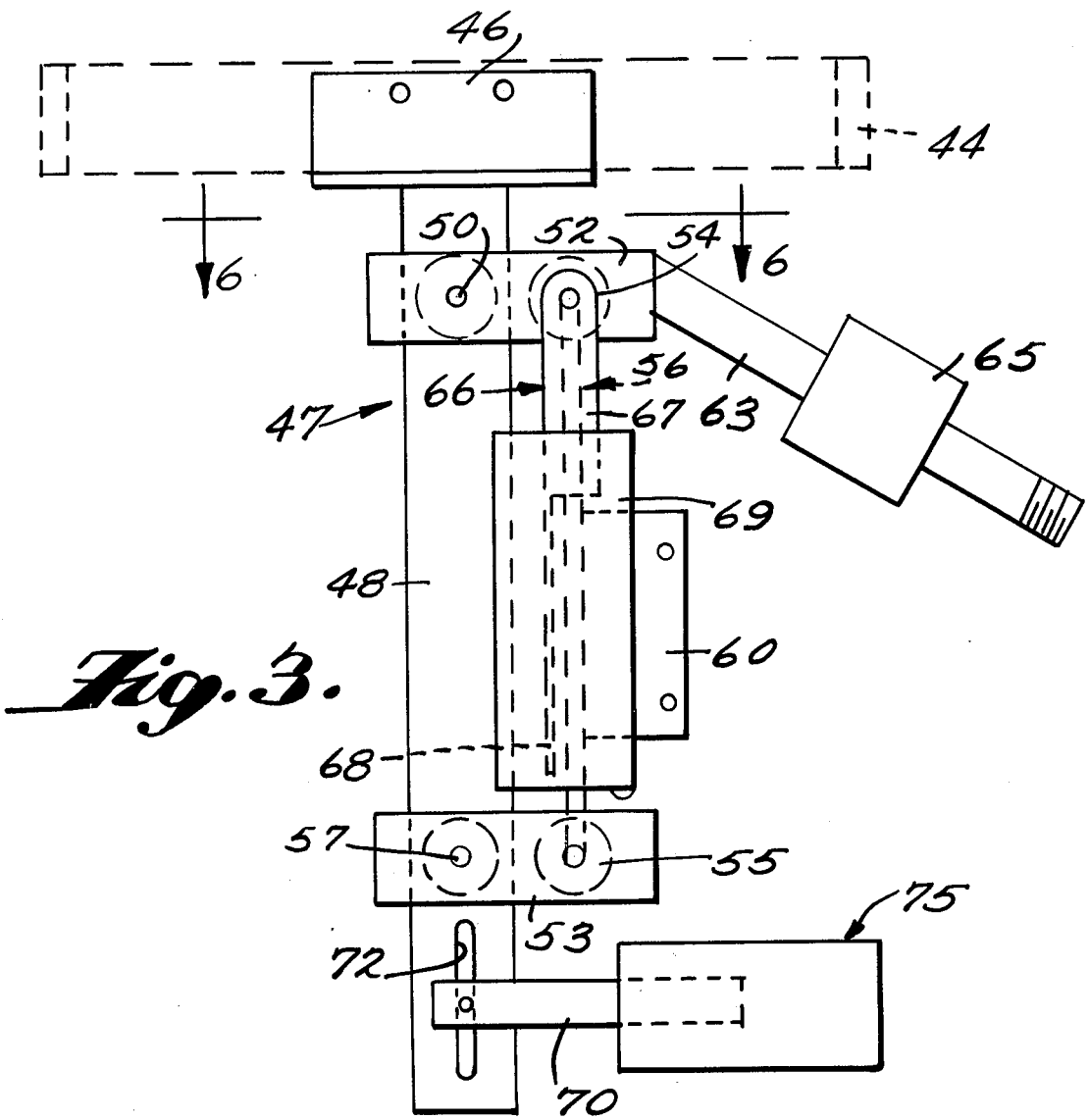
FIG. 3 is a frontal detail view with other parts removed of a scale according to the teachings of the present invention.

A weighing and bagging assembly according to the teachings of the present invention is shown generally at 10 in FIG. 1. A frame 12 mounts all the components of the assembly including a feed aparatus, shown generally at 15. The feed apparatus 15 is for delivering apples or other product from a source to be weighed and bagged. The feed apparatus 15 is constructed so that the feed does not impair the accuracy of the weighing mechanism (accomplishes this in part by feeding the pieces of fruit one at a time to the weighing mechanism so that a number of pieces of fruit do not fall on the weighing mechanism at one time thus resulting in a bay weight far over the desired weight), can feed all different shapes of commonly bagged fruit, and does not bruise the fruit. A platform portion 17, and sloped side portions 18 provide for movement of fruit placed thereon to the feeding brushes. Two feed brushes, 19 and 21, act in cooperation. The brush 19 is a soft-bristled spiral brush which is rotated in the clockwise direction about its longitudinal axis by a conventional feed motor [not shown]. The soft-bristle brush 21 is cylindrical rather than spiral and is freely rotatable about its longitudinal axis when acted upon by fruit moved by the spiral brush 19. The action of the two brushes 19 and 21 together results in single file feeding of randomly sized product to the weighing apparatus with little or no bruising.

At the delivery end of the feed mechanism 15 is a landing 23. A gate 25 normally closes off the landing and thereby prevents the product from being delivered from the feed apparatus 15 to the weighing and bagging mechanism, shown generally at 30 in FIG. 1. As shown in detail in FIG. 2, the gate 25 is mounted to a rod 26 which is guided by guides 28 mounted to frame 12 during linear movement in a vertical plane. The rod 26 is pivotally connected at 27 to an arm 29, which is also pivotally connected at 31 to another arm 33. A spring 35 normally biases the gate 25 to its most upward, product-blocking position by applying a counterclockwise force about pivot 31 and arm 33 on arm 29. A linkage 37 actuated by a solenoid 39 also mounted on frame 12 provides a clockwise force about pivot 31 and arm 33 when solenoid 39 is actuated. Solenoid 39 is energized during operation of the feed motor [not shown], and deenergized when the feed motor is deactuated.

Positioned in operative relationship with the landing 23 is the weighing and bagging assembly 30. This assembly includes a conventional scoop 40 having a hinged plate 41 attached thereto for directing the fall of product from the landing 23. The interior of the scoop 40 and the plate 41 are padded with rubber to minimize product bruising. The scoop 40 is pivotal about pivots 42. During delivery of product by the feed apparatus, the scoop is in the position shown in FIG. 1. When the scoop contains the desired amount of product, it is manually pivoted about pivot 42 to an overcenter position wherein the front of the scoop is pointing downwardly, causing product contained therein to flow therefrom to a bag placed on the end of the scoop. Then the scoop 40 may be manually moved back to its normal position to receive another quantity of product.

The pivots 42 for the scoop 40 are mounted in a yoke member 44. The yoke member 44 is rigidly attached to a plate 46 for the scale mechanism, shown generally at 47 in FIG. 3. The plate 46 in the top portion of an elongated moveable plate 48 having collar portions 49 (see FIG. 6 especially) at spaced locations thereof. The collars 49 of the plate 48 are connected to box members 52 and 53 respectively, by pins 50 and 51 respectively extending there-through. The box members 52 and 53 are connected at the other end thereof by pins 54 and 55 respectively to collar portions 58 and 59 of support member 56. The support member 56 includes an elongated plate 57 (see FIG. 4) and a plate 60 that is rigidly attached to the frame 12. The connections between the collars 49, 58 and 59 and the rods 50, 51, 54 and 55 incorporate ball-bearings therewith so that the pivotal motion of the members relative to each other at these pivot points is virtually friction free. Since this is a four point linkage system with ball-bearings at each point, the construction is sturdy, accurate and reliable as well as having low mechanical hysteresis.

The balance weight for the scale is preferably provided by a weight 65 screw-threadable on a threaded rod 63. The weight 65 is threaded along the rod 63 to adjust the weight of product which will balance the scale. The rod 63 is rigidly attached - as by welding - to the upper box member 52. The weight 65 naturally is massive enough so that at any point along the rod 63 it will balance the weight of the scoop 40 itself and its attachments. The scoop 40, its attachments, and the plate 48 are preferably made of light-weight metal to decrease the inertia of the system.

Figure 6:
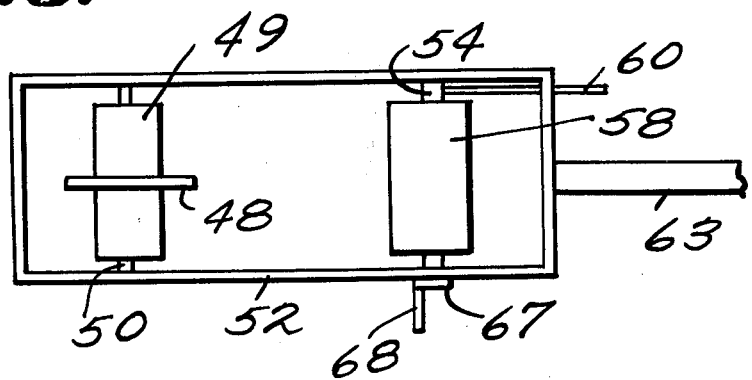
FIG. 6 is a view of the pivotal connections for the scale members with other parts removed taken along lines 6—6 of FIG. 3.

Rigidly attached to the box member 52 to pivot therewith is a damping means, shown generally at 66 (see FIGS. 5 and 6 especially). The damping means 66 is provided so that the accuracy of the scale will remain high despite repeated operations in quick succession. The damping means 66 consists of a plate section 67 which is attached to the member 52 at pin 54, and a paddle section 68 attached at a right angle to the plate 67. The paddle 68 is immersed within a container 69 that may be filled with some damping fluid, such as oil. A dust cover or seal [neither shown] may be provided at the open top of container 69. It will be seen that the damping means 66 will provide damping during pivotal movement of the scale mechanisms in either direction since the paddle 68 is pivotal with the box member 52. The amount of damping provided by the damping means 66 may be adjusted merely by varying the volume of liquid within the container 69.

The movement of a vane 70 attached to the bottom of the plate 48 of the scale mechanism 47 is sensed by a photoresistor. The vane 70 is adjustable along the length of a slot 72 in plate 48, and is maintained in the position to which it is moved relative to a slot 72 and plate 48 by a screw and wing nut [not shown]. The unattached end of the vane 70 extends through a slot into a casing 75 for the photoresistor. Since no mechanical linkages are used - only electronic equipment - the motion of the scale is not hindered and a high degree of repeat accuracy is incorporated into the scale.

As can be seen from FIG. 1, the casing 75 for the photoresistor is attached to the frame 12, as is the solenoid 39, a casing 80 containing all the electronic equipment for giving scale readout and breaking the feed motor (as will be described in more detail below) and a meter 85.

Figure 7:
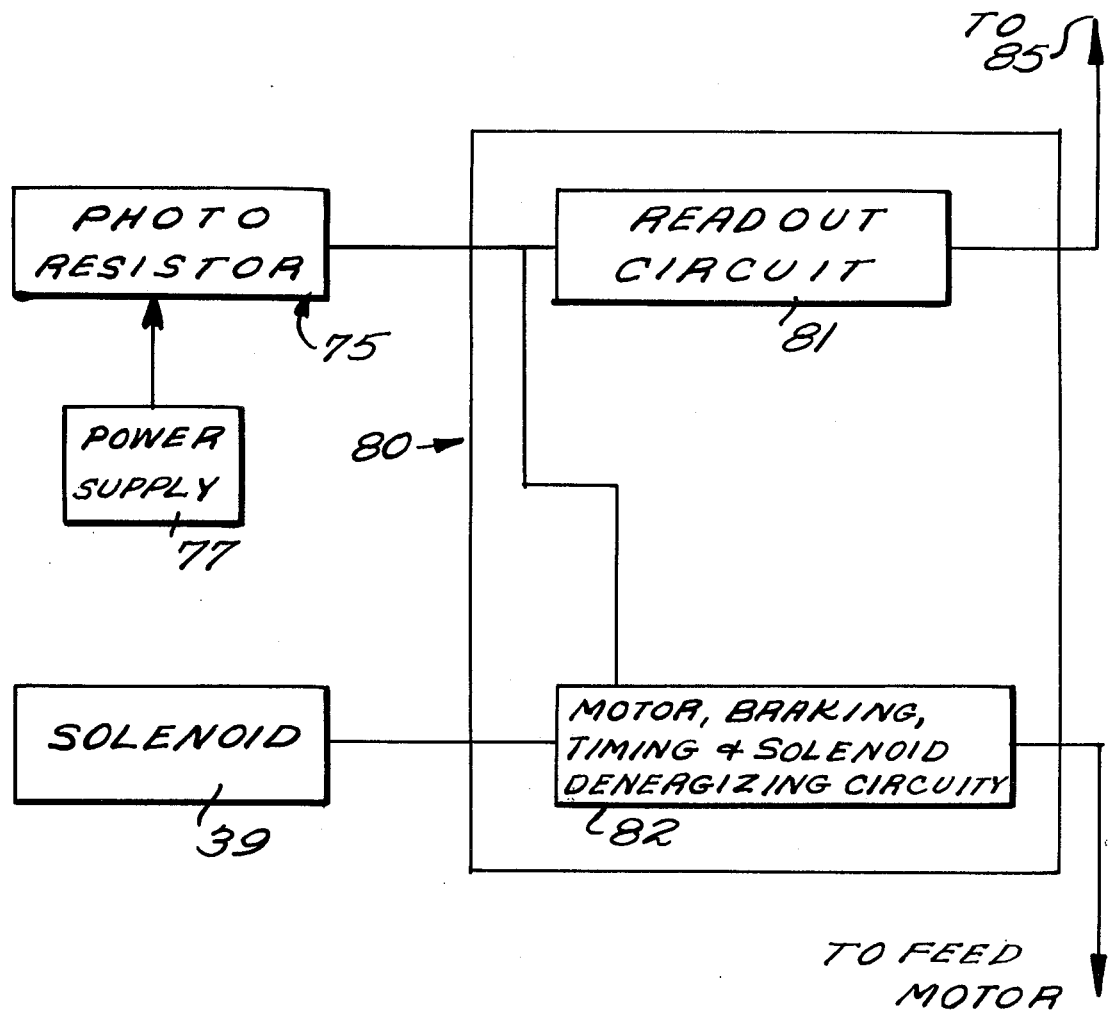
FIG. 7 is a schematic view of the systems responsive to scale movement according to the present invention.

The photoresistor or photocell contained within casing 75 receives more and more light from a light source, also located within casing 75, as the vane 70 moves downwardly in response to the weight of product accumulating in the scoop 40. As is shown schematically in FIG. 7, any suitable power supply 77 is connected to the photoresistor. As the amount of light being delivered to the photoresistor increases, its resistance decreases. The amount of current flowing through the photoresistor is sensed by the readout circuitry 81 contained within the casing 80, and is translated to a visual display on meter 85. The display may be digital so that it is easy for the operator to read. Once the current flowing through the photoresistor has reached the desired point, determined by adjustment of the weight 65 and the vane 70 to correspond to a given weight of product within the scoop 40, the solenoid 39 will be de-energized and current for the motor will be cut off and the motor braked by circuitry 82 (also contained within casing 80). Although the motor braking circuit could be used to mechanically brake or clutch the feed motor, it is preferred that direct current dynamic braking be utilized instead; by braking in this manner, a magnetic field is built up which acts in opposition to the residual magnetic field in the feed motor armature (the field that remains after current to the armature has been cut off) to instantaneously brake the motor while not putting undue wear on its mechanical components. Since the braking current need only be instantaneous, a timing circuit may be used. Once the scoop has been emptied, when it is returned to its normal position, it actuates a reset switch [not shown] which causes the circuitry 82 to re-energize the solenoid 39 and start up the feed motor.

As shown in FIG. 1, a control box 90 for controlling all the electrical components of the feed, weighing, and bagging assembly may be provided, as well as a dispenser 95 for plastic bags in which the product to be weighed is packaged.

OPERATION

To operate the device, the operator adjusts the balance weight 65 and the vane 70 so that the feed motor and the gate solenoid will be deactivated upon the desired weight of apples or other product being delivered to the scoop 40, makes sure that the scoop 40 is in its normal upright position, and then turns on the feed motor [not shown] and the electronic equipment power supply [not shown] and energizes the solenoid 39 at the control box 90. Apples are then placed on feed apparatus 15 and delivered in single file to the landing 23 by the interacting of the spiral brush 19 powered by the feed motor and the cylindrical brush 21. Since the motor is activated and the solenoid 39 is energized, the gate 25 is in its lowermost position, allowing passage of the apples over the landing 23 under the flap 41 to the scoop 40.

As the quantity of apples builds up in the scoop 40, their weight will cause the downward movement of the moveable plate 48 of the scale mechanism about the ball-bearing pivots at 50, 51, 54 and 55 of the four point linkage system. This movement also results in movement of the vane 70, which translates the movement of the plate 48 to a visual display on the meter 85. Once the desired weight is reached (once the apple is delivered that results in the weight in the scoop 40 being over the desired weight for the product package), the motor braking and solenoid de-energizing circuitry 82 is actuated, and the feed motor is instantaneously momentarily braked and the solenoid 39 is de-energized, resulting is the stoppage of the delivery of apples by the feed apparatus 15 to the landing 23, and the upward movement of the gate 25 by spring 35 into position to positively stop further movement of apples past the landing 23 to the scoop 40.

After the feed apparatus is stopped, and the gate is allowed to return to its normal product-flow stopping position, the operator places a plastic bag from the dispenser 95 over the end of the scoop 40 and manually tilts the scoop 40 overcenter about its pivots 42 to the position where the front of the scoop is facing downwardly so that the apples in the scoop will fall into the plastic bag on the end of the scoop. After the bag is tied off, the operator manually tilts the scoop 40 back to its original position, and the scoop 40 activates a reset switch (not shown) which restarts the feed motor and energizes the solenoid 39 so that product may once again be delivered to the scoop 40. Any oscillation of the scale mechanism 47 is damped by the damping means 66.

It will be seen that a semi-automatic product feed, weigh, and bag assembly according to the teachings of the present invention is provided that is easy to operate, reliable and has low friction and a high degree of accuracy and accomplishes all the objectives of the present invention. While the invention has been disclosed in what is presently conceived to be the most practical and preferred embodiments, it is apparent that many modifications could be made thereof within the scope of the invention, which scope is not to be limited except by the appended claims.

What I claim is:

1. An assembly for weighing and bagging fruit or like product, said assembly comprising
   a. scoop means for receiving fruit and facilitating weighing and bagging of said fruit,
   b. a scale for weighing the accumulated fruit received by said scoop means, said scale including (i) a moveable member operatively connected to said scoop means, (ii) a stationary member rigidly connected to a frame for said assembly, (iii) two spaced link means, each of said link means pivotally connected at spaced pivot points thereof to said moveable member and said stationary member, (iv) ball-bearings located at the pivot points between each of said link means and said stationary member and said moveable member respectively, and (v) a balance weight operatively connected to one of said link means, and
   c. means for delivering fruit to said scoop means.

2. An assembly as recited in claim 1 wherein said balance weight comprises a member having a threaded aperture therein and a threaded rod operatively connected at one end thereof to one of said link means, said apertured member threadable on said threaded rod to adjust the distance of said apertured member from the end of said rod connected to said link means.

3. An assembly as recited in claim 1 wherein said moveable member is operatively connected to said scoop means by a yoke rigidly attached to said moveable member and pivot pins attached to said yoke and said scope means, said pivot pins defining an axis about which said scoop means may pivot.

4. An assembly as recited in claim 1 wherein said scale further comprises means for damping oscillation of said scale in pivoting in either clockwise or counterclockwise direction about said pivot points.

5. An assembly as recited in claim 4 wherein said damping means includes a paddle rigidly connected to one of said link means, and a container of damping fluid, said paddle being disposed within said container for cooperation with said fluid.

6. An assembly as recited in claim 1 wherein said moveable member comprises a plate having collars at spaced portions thereof for receiving pin means for pivotally connecting said moveable member to said link means, and wherein said stationary member includes a plate portion having collars at spaced portions thereof for receiving pin means for pivotally connecting said stationary member to said link means.

7. An assembly as recited in claim 6 wherein each of said two link means comprises four plates operatively connected to form a box, two opposing sides of said box having recesses therein for receiving said pin means for pivotally connecting the collars of said moveable and stationary members respectively to said link means.

8. An assembly as recited in claim 7 wherein said ball-bearings are provided between said pin means and said collars at each of the connections between said link means and said moveable and stationary members.

* * * * *